Figures 1, 2:
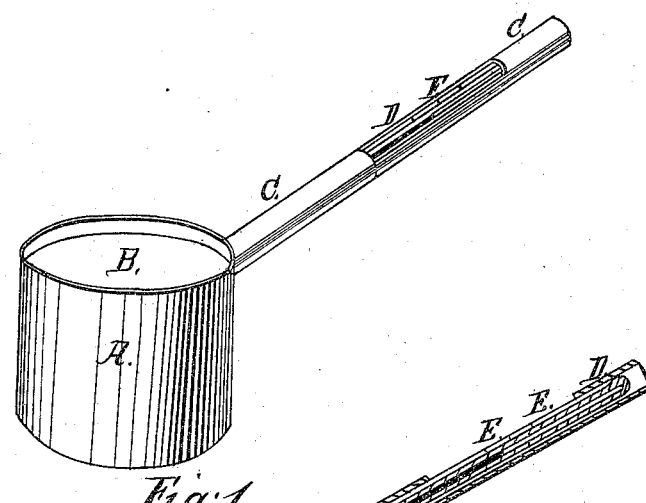

H. M. Hartshorn.
Inst. for Testing Illuminating Oils.

N° 91,843.      Patented Jun. 29, 1869.

Witnesses.
W. H. Sherman
R. A. Wiggin.

Inventor.
H. M. Hartshorn.
by his attorney B. W. Williamson

HENRY M. HARTSHORN, OF MALDEN, MASSACHUSETTS.

Letters Patent No. 91,843, dated June 29, 1869.

IMPROVED INSTRUMENT FOR TESTING THE INFLAMMABILITY OF ILLUMINATING-OILS.

The Schedule referred to in these Letters Patent and making part of the same.

To all whom it may concern:

Be it known that I, HENRY M. HARTSHORN, of Malden, in the county of Middlesex, and State of Massachusetts, have invented a new and useful Apparatus for Testing the Inflammability of Illuminating-Oils; and I do declare that the following is a full and exact description thereof, reference being had to the accompanying drawings, and to the letters of reference marked thereon.

Figure 1 represents an exterior view of my apparatus, in which A represents a tight vessel, holding the bulb of the thermometer, and filled with water or other fluid.

B is the top of the tight vessel, and the bottom of the cavity or depression holding the oil.

C is the tube which protects the stem of the thermometer, and answers the purpose of a handle.

D is the fluid in the thermometer.

E represents the graduation-points on the thermometer, viz, 100, 110, 120, Fahrenheit.

Figure 2 represents a longitudinal section of my apparatus.

B shows the thickness of the top of the tight vessel, and the bottom of the cavity holding the oil.

C is the bulb of the thermometer.

F is the cement, holding the thermometer in place, and serving to make the vessel tight.

In using the apparatus for an oil-test, I heat the vessel by plunging it into hot water, or by holding it over a fire, or otherwise, until the thermometer indicates the point 110, which is represented by the centre one of the three marks, E.

I then pour a small quantity of oil into the cavity, barely sufficient to cover the bottom, fig. 1, B, and then pass a lighted taper quickly over the surface of the oil, taking care to avoid touching the oil, and if the oil ignites with the thermometer at 110, the legal test, it is declared as dangerous and explosive.

I make the top of the vessel of thicker material than the other parts, in order that the mass of metal thus obtained may serve as a conductor of heat, thereby keeping the oil at a uniform temperature, by absorbing the excess of heat, which it might receive from the lighted taper.

What I claim, and desire to secure by Letters Patent, is—

1. The tight vessel, filled with water or other fluid.
2. The cavity or depression, fig. 1, B, holding the oil, forming the top of the vessel.
3. The mass of metal, forming the top of the vessel, and the bottom of the cavity holding the oil.
4. The combination of the stem of the thermometer with the tube, for the purpose of forming the handle.

HENRY M. HARTSHORN.

Witnesses:
H. W. WILLIAMS,
R. A. WIGGIN.